United States Patent
Harikrishnan et al.

(10) Patent No.: US 11,115,294 B2
(45) Date of Patent: Sep. 7, 2021

(54) AUTOMATIC DYNAMIC DETERMINATION OF DATA TRAFFIC SAMPLING POLICY IN A NETWORK VISIBILITY APPLIANCE

(71) Applicant: Gigamon Inc., Santa Clara, CA (US)

(72) Inventors: Bharath Harikrishnan, San Jose, CA (US); Tushar Rajnikant Jagtap, Fremont, CA (US); Fernando Garcia-Rosell Foronda, San Jose, CA (US)

(73) Assignee: Gigamon Inc., Santa Clara, CA (US)

( * ) Notice: Subject to any disclaimer, the term of this patent is extended or adjusted under 35 U.S.C. 154(b) by 43 days.

(21) Appl. No.: 16/405,674

(22) Filed: May 7, 2019

(65) Prior Publication Data

US 2020/0358674 A1 Nov. 12, 2020

(51) Int. Cl.
*H04L 12/26* (2006.01)
*H04L 12/851* (2013.01)

(52) U.S. Cl.
CPC .......... *H04L 43/024* (2013.01); *H04L 43/026* (2013.01); *H04L 43/0888* (2013.01); *H04L 43/0894* (2013.01); *H04L 47/2441* (2013.01)

(58) Field of Classification Search
CPC . H04L 43/024; H04L 43/026; H04L 43/0888; H04L 43/0894; H04L 47/2441
See application file for complete search history.

(56) References Cited

U.S. PATENT DOCUMENTS

| 8,514,723 B2 * | 8/2013 | Malomsoky | .......... H04L 43/026 370/241 |
| 9,935,968 B2 * | 4/2018 | Pal | ........................ H04L 43/022 |
| 10,270,700 B2 * | 4/2019 | Burnette | ............. H04L 43/0888 |
| 2007/0041331 A1 | 2/2007 | Ma et al. | |
| 2008/0310460 A1 | 12/2008 | Bargauan | |
| 2009/0303901 A1 | 12/2009 | Duffield et al. | |
| 2011/0205916 A1 * | 8/2011 | Dinan | ................... H04L 43/028 370/252 |

(Continued)

FOREIGN PATENT DOCUMENTS

| EP | 2291950 B1 | 1/2012 |
| WO | 2016141239 A1 | 9/2016 |
| WO | 2016160553 A1 | 10/2016 |

OTHER PUBLICATIONS

International Search Report and Written Opinion dated Jul. 14, 2020 cited in PCT/US20/30277.

(Continued)

*Primary Examiner* — Esther B. Henderson
*Assistant Examiner* — Nazia Naoreen
(74) *Attorney, Agent, or Firm* — Perkins Coie LLP

(57) ABSTRACT

A network visibility appliance automatically and dynamically determines a data traffic sampling policy that it should apply, i.e., a policy for determining which flows the network appliance should forward to one or more tools. The technique can be used to adjust for changes in network traffic to avoid exceeding performance constraints (e.g., maximum throughput) of network analytic tools, while maintaining high efficiency of usage of the tools. In the technique, a policy engine monitors network traffic characteristics in a subscriber throughput table and dynamically determines a sampling policy to apply, so as to decrease and/or increase traffic throughput to a given tool, so that the tool is efficiently used.

31 Claims, 12 Drawing Sheets

(56) References Cited

U.S. PATENT DOCUMENTS

| | | | |
|---|---|---|---|
| 2014/0112187 A1* | 4/2014 | Kang | H04L 43/026 370/253 |
| 2014/0325649 A1* | 10/2014 | Zhang | H04L 63/1425 726/23 |
| 2015/0085694 A1 | 3/2015 | Agarwal et al. | |
| 2015/0236895 A1 | 8/2015 | Kay | |
| 2017/0126725 A1 | 5/2017 | Pal et al. | |
| 2019/0166020 A1* | 5/2019 | Mommileti | H04L 65/605 |
| 2019/0230008 A1* | 7/2019 | Labonte | H04L 43/022 |

OTHER PUBLICATIONS

U.S. Appl. No. 15/848,465 of Maziar Mirzazad Barijough et al. filed Dec. 20, 2017., Dec. 20, 2017.

Non Final Office Action dated Feb. 12, 2020 for U.S. Appl. No. 15/848,465, filed Dec. 20, 2017; 30 pages.

Final Office Action for U.S. Appl. No. 15/848,465, dated Sep. 21, 2020, 38 pages., Sep. 21, 2020.

Non-Final Office Action dated Feb. 16, 2021, for U.S. Appl. No. 15/848,465, 33 pages., Feb. 16, 2021.

\* cited by examiner

| Day | Subscriber Throughput Table | | | Theoretical Bandwidth per service per subscriber (Gbps) | | Actual Bandwidth per service per subscriber (Gbps) | | | | Total Actual Bandwidth per service period (Gbps) | | | Total Actual Bandwidth per time period (Gbps) | | |
|---|---|---|---|---|---|---|---|---|---|---|---|---|---|---|---|
| | Time | Subscriber ID | Service (APN) | QCI (Qos) | GBS | MBR | Mean | High | Low | Total Low | Total High | Total Mean | Total Low | Total High | Total Mean |
| 1 | 00:00-8:00 | 450051789123456 | IMS | 1 | 5 | 14 | 2 | 7 | 4.5 | 5 | 14 | 9.5 | 24 | 55 | 39.5 |
| 1 | 00:00-8:00 | 450051789123457 | IMS | 1 | 5 | 14 | 3 | 7 | 5 | | | | | | |
| 1 | 00:00-8:00 | 450051789123456 | Video | 4 | 4 | 11 | 4 | 6 | 5 | 9 | 13 | 11 | | | |
| 1 | 00:00-8:00 | 450051789123457 | Video | 4 | 4 | 11 | 5 | 7 | 6 | | | | | | |
| 1 | 00:00-8:00 | 450051789123456 | Internet | 7 | 2 | 8 | 3 | 4 | 3.5 | 7 | 9 | 8 | | | |
| 1 | 00:00-8:00 | 450051789123457 | Internet | 7 | 2 | 8 | 4 | 5 | 4.5 | | | | | | |
| 1 | 00:00-8:00 | 450051789123456 | Rest of Services | Any | 1 | 20 | 1 | 9 | 5 | 3 | 19 | 11 | | | |
| 1 | 00:00-8:00 | 450051789123457 | Rest of Services | Any | 1 | 20 | 2 | 10 | 6 | | | | | | |
| 1 | 8:01-16:00 | 450051789123456 | IMS | 1 | 5 | 14 | 4 | 9 | 6.5 | 8 | 18 | 13 | 35 | 69 | 52 |
| 1 | 8:01-16:00 | 450051789123457 | IMS | 1 | 5 | 14 | 4 | 9 | 6.5 | | | | | | |
| 1 | 8:01-16:00 | 450051789123456 | Video | 4 | 4 | 11 | 6 | 8 | 7 | 12 | 16 | 14 | | | |
| 1 | 8:01-16:00 | 450051789123457 | Video | 4 | 4 | 11 | 6 | 8 | 7 | | | | | | |
| 1 | 8:01-16:00 | 450051789123456 | Internet | 7 | 2 | 8 | 5 | 7 | 6 | 10 | 14 | 12 | | | |
| 1 | 8:01-16:00 | 450051789123457 | Internet | 7 | 2 | 8 | 5 | 7 | 6 | | | | | | |
| 1 | 8:01-16:00 | 450051789123456 | Rest of Services | Any | 1 | 20 | 2 | 10 | 6 | 5 | 21 | 13 | | | |
| 1 | 8:01-16:00 | 450051789123457 | Rest of Services | Any | 1 | 20 | 3 | 11 | 7 | | | | | | |
| 1 | 16:01-23:59 | 450051789123456 | IMS | 1 | 5 | 14 | 7 | 12 | 9.5 | 14 | 24 | 19 | 57 | 89 | 72 |
| 1 | 16:01-23:59 | 450051789123457 | IMS | 1 | 5 | 14 | 7 | 12 | 9.5 | | | | | | |
| 1 | 16:01-23:59 | 450051789123456 | Video | 4 | 4 | 12 | 9 | 12 | 10.5 | 18 | 24 | 21 | | | |
| 1 | 16:01-23:59 | 450051789123457 | Video | 4 | 4 | 12 | 9 | 12 | 10.5 | | | | | | |
| 1 | 16:01-23:59 | 450051789123456 | Internet | 7 | 2 | 9 | 8 | 9 | 8 | 16 | 18 | 16 | | | |
| 1 | 16:01-23:59 | 450051789123457 | Internet | 7 | 2 | 9 | 8 | 9 | 8 | | | | | | |
| 1 | 8:01-16:00 | 450051789123458 | Rest of Services | Any | 1 | 20 | 4 | 11 | 7.5 | 9 | 23 | 16 | | | |
| 1 | 8:01-16:00 | 450051789123457 | Rest of Services | Any | 1 | 20 | 5 | 12 | 8.5 | | | | | | |

FIG. 6A

| Subscriber Throughput Table | | | | Theoretical Bandwidth per service per subscriber (Gbps) | | Actual Bandwidth per service per subscriber (Gbps) | | | | Total Actual Bandwidth per service period (Gbps) | | | Total Actual Bandwidth per time period (Gbps) | | |
|---|---|---|---|---|---|---|---|---|---|---|---|---|---|---|---|
| Day | Time | Subscriber ID | Service (APN) | QCI (Qos) | GBS | MBR | Mean | High | Low | Total Low | Total High | Total Mean | Total Low | Total High | Total Mean |
| 2 | 00:00-8:00 | 450051789123456 | IMS | 1 | 5 | 14 | 2 | 7 | 4.5 | | | | | | |
| 2 | 00:00-8:00 | 450051789123457 | IMS | 1 | 5 | 14 | 3 | 7 | 5 | 5 | 14 | 9.5 | | | |
| 2 | 00:00-8:00 | 450051789123456 | Video | 4 | 4 | 11 | 4 | 6 | 5 | | | | | | |
| 2 | 00:00-8:00 | 450051789123457 | Video | 4 | 4 | 11 | 5 | 7 | 6 | 9 | 13 | 11 | 24 | 55 | 39.5 |
| 2 | 00:00-8:00 | 450051789123456 | Internet | 6 | 2 | 8 | 3 | 4 | 3.5 | | | | | | |
| 2 | 00:00-8:00 | 450051789123457 | Internet | 6 | 2 | 8 | 4 | 5 | 4.5 | 7 | 9 | 8 | | | |
| 2 | 00:00-8:00 | 450051789123456 | Rest of Services | Any | 1 | 20 | 1 | 9 | 5 | | | | | | |
| 2 | 00:00-8:00 | 450051789123457 | Rest of Services | Any | 1 | 20 | 2 | 10 | 6 | 3 | 19 | 11 | | | |
| 2 | 8:01-16:00 | 450051789123456 | IMS | 1 | 5 | 14 | 4 | 9 | 6.5 | | | | | | |
| 2 | 8:01-16:00 | 450051789123457 | IMS | 1 | 5 | 14 | 4 | 9 | 6.5 | 8 | 18 | 13 | | | |
| 2 | 8:01-16:00 | 450051789123456 | Video | 4 | 4 | 11 | 6 | 8 | 7 | | | | | | |
| 2 | 8:01-16:00 | 450051789123457 | Video | 4 | 4 | 11 | 6 | 8 | 7 | 12 | 16 | 14 | 35 | 69 | 52 |
| 2 | 8:01-16:00 | 450051789123456 | Internet | 7 | 2 | 8 | 5 | 7 | 6 | | | | | | |
| 2 | 8:01-16:00 | 450051789123457 | Internet | 7 | 2 | 8 | 5 | 7 | 6 | 10 | 14 | 12 | | | |
| 2 | 8:01-16:00 | 450051789123456 | Rest of Services | Any | 1 | 20 | 2 | 10 | 6 | | | | | | |
| 2 | 8:01-16:00 | 450051789123457 | Rest of Services | Any | 1 | 20 | 3 | 11 | 7 | 5 | 21 | 13 | | | |
| 2 | 16:01-23:59 | 450051789123456 | IMS | 1 | 5 | 14 | 7 | 12 | 9.5 | | | | | | |
| 2 | 16:01-23:59 | 450051789123457 | IMS | 1 | 5 | 14 | 7 | 12 | 9.5 | 14 | 24 | 19 | | | |
| 2 | 16:01-23:59 | 450051789123456 | Video | 4 | 4 | 12 | 9 | 12 | 10.5 | | | | | | |
| 2 | 16:01-23:59 | 450051789123457 | Video | 4 | 4 | 12 | 9 | 12 | 10.5 | 18 | 24 | 21 | 57 | 89 | 72 |
| 2 | 16:01-23:59 | 450051789123456 | Internet | 7 | 2 | 9 | 8 | 9 | 8 | | | | | | |
| 2 | 16:01-23:59 | 450051789123458 | Internet | 7 | 2 | 9 | 8 | 9 | 8 | 16 | 18 | 16 | | | |
| 2 | 8:01-16:00 | 450051789123456 | Rest of Services | Any | 1 | 20 | 4 | 11 | 7.5 | | | | | | |
| 2 | 8:01-16:00 | 450051789123457 | Rest of Services | Any | 1 | 20 | 5 | 12 | 8.5 | 9 | 23 | 16 | | | |

FIG. 6B

| Day | Subscriber Throughput Table | | | Theoretical Bandwidth per service per subscriber (Gbps) | | Actual Bandwidth per service per subscriber (Gbps) | | | Total Actual Bandwidth per service period (Gbps) | | | Total Actual Bandwidth per time period (Gbps) | | |
|---|---|---|---|---|---|---|---|---|---|---|---|---|---|---|
| | Time | Subscriber ID | Service (APN) | QCI (Qos) | GBS | MBR | Mean | High | Low | Total Low | Total High | Total Mean | Total Low | Total High | Total Mean |
| 3 | 00:00-8:00 | 45005178912345 6 | IMS | 1 | 5 | 14 | 2 | 7 | 4.5 | 5 | 14 | 9.5 | 24 | 55 | 39.5 |
| 3 | 00:00-8:00 | 45005178912345 7 | IMS | 1 | 5 | 14 | 3 | 7 | 5 | | | | | | |
| 3 | 00:00-8:00 | 45005178912345 6 | Video | 4 | 4 | 11 | 4 | 6 | 5 | 9 | 13 | 11 | | | |
| 3 | 00:00-8:00 | 45005178912345 7 | Video | 4 | 4 | 11 | 5 | 7 | 6 | | | | | | |
| 3 | 00:00-8:00 | 45005178912345 6 | Internet | 7 | 2 | 8 | 3 | 4 | 3.5 | 7 | 9 | 8 | | | |
| 3 | 00:00-8:00 | 45005178912345 7 | Internet | 7 | 2 | 8 | 4 | 5 | 4.5 | | | | | | |
| 3 | 00:00-8:00 | 45005178912345 6 | Rest of Services | Any | 1 | 20 | 1 | 9 | 5 | 3 | 19 | 11 | | | |
| 3 | 00:00-8:00 | 45005178912345 7 | Rest of Services | Any | 1 | 20 | 2 | 10 | 6 | | | | | | |
| 3 | 8:01-16:00 | 45005178912345 6 | IMS | 1 | 5 | 14 | 4 | 9 | 6.5 | 8 | 18 | 13 | 35 | 69 | 52 |
| 3 | 8:01-16:00 | 45005178912345 7 | IMS | 1 | 5 | 14 | 4 | 9 | 6.5 | | | | | | |
| 3 | 8:01-16:00 | 45005178912345 6 | Video | 4 | 4 | 11 | 6 | 8 | 7 | 12 | 16 | 14 | | | |
| 3 | 8:01-16:00 | 45005178912345 7 | Video | 4 | 4 | 11 | 6 | 8 | 7 | | | | | | |
| 3 | 8:01-16:00 | 45005178912345 6 | Internet | 7 | 2 | 8 | 5 | 7 | 6 | 10 | 14 | 12 | | | |
| 3 | 8:01-16:00 | 45005178912345 7 | Internet | 7 | 2 | 8 | 5 | 7 | 6 | | | | | | |
| 3 | 8:01-16:00 | 45005178912345 6 | Rest of Services | Any | 1 | 20 | 2 | 10 | 6 | 5 | 21 | 13 | | | |
| 3 | 8:01-16:00 | 45005178912345 7 | Rest of Services | Any | 1 | 20 | 3 | 11 | 7 | | | | | | |
| 3 | 16:01-23:59 | 45005178912345 6 | IMS | 1 | 5 | 14 | 7 | 12 | 9.5 | 14 | 24 | 19 | 57 | 89 | 72 |
| 3 | 16:01-23:59 | 45005178912345 7 | IMS | 1 | 5 | 14 | 7 | 12 | 9.5 | | | | | | |
| 3 | 16:01-23:59 | 45005178912345 6 | Video | 4 | 4 | 12 | 9 | 12 | 10.5 | 18 | 24 | 21 | | | |
| 3 | 16:01-23:59 | 45005178912345 7 | Video | 4 | 4 | 12 | 9 | 12 | 10.5 | | | | | | |
| 3 | 16:01-23:59 | 45005178912345 6 | Internet | 7 | 2 | 9 | 8 | 9 | 8 | 16 | 18 | 16 | | | |
| 3 | 16:01-23:59 | 45005178912345 7 | Internet | 7 | 2 | 9 | 8 | 9 | 8 | | | | | | |
| 3 | 8:01-16:00 | 45005178912345 8 | Rest of Services | Any | 1 | 20 | 4 | 11 | 7.5 | 9 | 23 | 16 | | | |
| 3 | 8:01-16:00 | 45005178912345 7 | Rest of Services | Any | 1 | 20 | 5 | 12 | 8.5 | | | | | | |

FIG. 6C

| Service Type | Increments/Decrements | Buffer | QoS QCI | Tool Type | Min (Gbps) | Max (Gbps) |
|---|---|---|---|---|---|---|
| IMS | 5% | 40% | 1 | Tool | 40 | 50 |
| Video | 10% | 10% | 4 | | | |
| Internet | 20% | 0% | 7 | | | |
| Rest of services | 50% | 0% | Any | | | |

FIG. 7

AUTOMATIC DYNAMIC DETERMINATION OF DATA TRAFFIC SAMPLING POLICY IN A NETWORK VISIBILITY APPLIANCE

FIELD

At least one embodiment of the present disclosure pertains to network visibility technology, and more particularly, to a technique for automatically and dynamically determining a data traffic sampling policy in a network visibility appliance.

BACKGROUND

With the amounts of data traffic on modern computer networks continually increasing, network monitoring and security measures play an increasingly important role in reducing the vulnerability of a network to intrusion, unauthorized access and other security or performance issues. Various types of tools can be deployed in a computer network that process the network traffic and provide monitoring and security services. Examples of such tools include an intrusion detection system (IDS), an intrusion prevention system (IPS), a packet sniffer, a network monitoring system, an application monitoring system, an intrusion detection system, a forensic storage system, and an application security system, among others.

Tools deployed in a network environment are only effective to the extent that the relevant network traffic is visible to them. Existing approaches to making network traffic visible to such tools include connecting one or more network appliances (traffic visibility appliances) to the network and to the tools. In an in-line deployment, packets originating from a source node on a computer network are received by the network appliance, then routed by the network appliance through one or more tools (which are usually but not necessarily directly connected to the network appliance) and back to the network appliance; the packets are then forwarded by the network appliance to the intended destination node. In contrast, in an out-of-band deployment, copies of packets originating from a source node are made by the network appliance and routed to one or more tools, while the original packets are forwarded by the network appliance to the intended destination node.

In some instances the tools may not have the capacity to examine all of the flows received by the network appliance, such as during periods of heavy network traffic. In this application, a "flow" or "traffic flow" is defined as a series of packets between a source and a destination within the same transport connection. Packets of a single flow share some set of characteristics or fields, such as source IP address, IP destination address, L4 port source, L4 port destination, and protocol. For example, if two packets contain the exact same values for all five of the above-mentioned fields (5-tuple), then the two packets are considered to be part of the same flow. Since the tools may not have the capacity to examine all of the flows received by the network appliance, the network appliance may "sample" the flows for purposes of forwarding them to the tool; that is, the network appliance may forward some of the flows (the "sampled" flows) that it receives, but not all of them, to the tool, to avoid exceeding the performance limits of the tool. In conventional deployments, sampling is a performed according to a manually defined sampling policy. Such a sampling policy is static, i.e., it remains the same regardless of changes in the network traffic. This leads to inefficient utilization of the tool's capacity, since sampling policies are defined conservatively to avoid exceeding a tool's maximum throughput, which this results in significant capacity of a tool not being used during times of lower network traffic. It also requires significant time and effort by human network administrators to manually update sampling policies that are considered suboptimal.

BRIEF DESCRIPTION OF THE DRAWINGS

One or more embodiments of the present disclosure are illustrated by way of example and not limitation in the figures of the accompanying drawings, in which like references indicate similar elements.

FIGS. 6A, 6B and 6C collectively illustrate an example of a subscriber throughput table.

FIG. 7 illustrates an example of the data record in the policies database.

DETAILED DESCRIPTION

Figure 1:
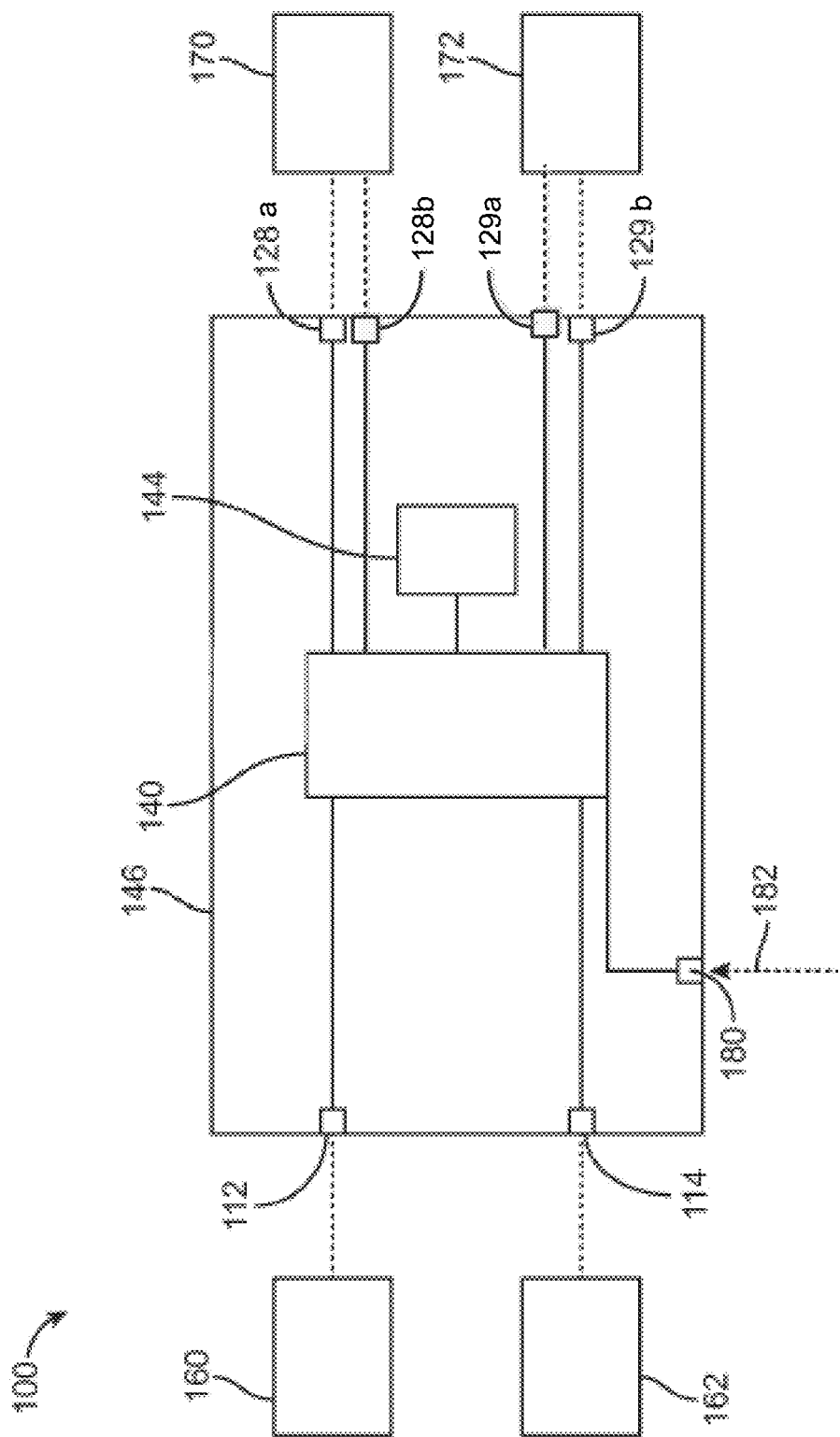
FIG. 1 illustrates an example of a network visibility appliance.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Introduced here is a technique by which a network visibility appliance can automatically and dynamically determine a data traffic sampling policy that it should apply, i.e., a policy for determining which flows the network appliance should forward to one or more tools. The technique can be useful particularly, though not only, in the infrastructure portion of a wireless telecommunications network. The technique can be used to adjust for changes in network traffic to avoid exceeding performance constraints (e.g., maximum throughput) of network analytic tools, while maintaining high efficiency of usage of the tools. For example, in this technique, a policy engine constantly monitors network traffic characteristics in a subscriber throughput table and dynamically determines a sampling policy to apply, so as to decrease and/or increase traffic throughput to a given tool, so that the tool is always efficiently used.

One scenario in which a network visibility appliance can be useful is in the infrastructure portion of a wireless telecommunications network. The infrastructure portion of a wireless telecommunications network is the wired portion of the wireless operator's network and is sometimes called the terrestrial radio access network (TRAN), or the wireless operator's "core network." A wireless operator can deploy one or more network visibility appliances in their TRAN, such as in a 4G/LTE or 5G telecommunications network, to allow various tools to monitor and/or affect various types of data traffic traversing their network. The traffic may include both control plane packets and user plane packets.

A network visibility appliance (hereinafter called simply "network appliance") in a TRAN deployment can support flow sampling. Flow sampling allows a wireless operator to scale down subscriber traffic to be monitored by analytic tools in order to meet their processing throughput. This can be implemented by wireless operators to decide which subscribers, which traffic type, and how much of each traffic type is monitored and analyzed by tools, through a set of configurations, rules and/or policies.

A disadvantage of that method by itself is that the configurations, rules and/or policies are static, and editing them requires manual intervention. For example, sampling policies need to be manually configured, and these are applied constantly on all traffic regardless of any changes seen on the traffic, which does not optimize use of tools.

The technique introduced here, on the other hand, can use multiple inputs, such as metadata about the traffic, to edit configurations, rules and policies automatically and dynamically (i.e., as network traffic is being processed by the network appliance), and hence, can reduce or eliminate the network operators intervention and optimize the use of tools proactively. For example, sampling rules and percentages can be dynamically configured based on the analysis of metadata collected about network traffic, its pattern, subscriber behavior, etc., and additional sources of information that could be collected by the network appliance. Examples of possible input parameters include: session establishment/deletion rates, duration of established sessions, bit rates seen per session and APN/QCI distribution throughout the day. Any or all this information could be used as input to proactively define the sampling configuration to optimize the use of the tools.

In some embodiments, the technique introduced here entails a network appliance ascertaining a characteristic of data traffic associated with the network, such as throughput, by examining a first plurality of flows; then dynamically determining, without user input, a sampling policy for use in determining the forwarding of flows from the network appliance to a particular tool, based on the ascertained characteristic of the data traffic; then receiving a second plurality of flows communicated on the network; and then applying the determined sampling policy to select flows of the second plurality of flows to be forwarded to the tool.

Dynamically determining a sampling policy might involve dynamically deriving a modified sampling policy based on a sampling policy that is currently in use by the network appliance for a given tool. For example, the network appliance may determine that it needs to decrement or increment a current sampling percentage being used for a given traffic type and tool, by a specified decrementer or incrementer value. Further, dynamically determining the sampling policy might include determining a different sampling policy (e.g., a different sampling percentage) for each of various different types of network traffic/flows, based on a known prioritization of those traffic types. Note that in this description, the terms "traffic type" and "service type" are used synonymously. The different traffic types may include, for example, Internet Protocol (IP) Multimedia Subsystem (IMS), video, Internet, and others.

Further, the network appliance can dynamically determine a sampling policy based on an expected value of a characteristic of data traffic for a future time period (e.g., the expected network throughput for the next eight hours) and a performance parameter of the tool (e.g., the tool's maximum throughput). The network appliance can also use its own buffering capacity to increase the sampling percentage for certain types of traffic, such as higher priority traffic, when the current network throughput is below maximum throughput for a tool.

Further details of the technique introduced here are provided below and in the accompanying drawings. Before discussing those details, however, it is useful to consider an example of a network appliance and an environment in which it can be used.

FIG. 1 illustrates an example of a network visibility appliance ("network appliance") 100, in which the technique introduced here can be implemented. The network appliance 100 includes a first network port 112, a second network port 114, a first pair of tool ports including an egress tool port 128a and an ingress tool port 128b, and a second pair of tool ports including an egress port 129a and an ingress port 129b. Packets received by the network appliance 100 are sent through tool egress port 128a to tool 170, which after processing those packets returns them to the network appliance 100 through tool ingress port 128b. Similarly, packets received by the network appliance 100 are sent through tool egress port 129a to tool 172, which after processing those packets returns them to the network appliance 100 through tool ingress port 129b. In other embodiments the network appliance 100 may contain more or fewer tool ports that four, and in operation, it may be coupled to more or fewer tools than two.

The network appliance 100 also includes a packet switch ("switch module") 140 that implements selective coupling between network ports 112, 114 and tool ports 128, 129. As used in this specification, the term "tool port" refers to any port that is configured to transmit packets to or to receive packets from a tool. The network appliance 100 further includes a processor 144, and a network switch housing 146 for containing the packet switch 140 and the processor 144. The processor 144 may be, for example, a general-purpose programmable microprocessor (which may include multiple cores), an application specific integrated circuit (ASIC) processor, a field programmable gate array (FPGA), or other convenient type of circuitry.

The network appliance 100 may also include other components not shown, such as one or more network physical layers ("PHYs") coupled to each of the respective ports 112, 114, wherein the network PHYs may be parts of the packet switch 140. Alternatively, the network PHYs may be components that are separate from the integrated circuit 140. The PHY is configured to connect a link layer device to a physical medium such as an optical fiber, copper cable, etc. In other embodiments, instead of the PHY, the network appliance 100 may include an optical transceiver, or a Serializer/Deserializer (SerDes), etc.

The housing 146 allows the network appliance 100 to be carried, transported, sold, and/or operated as a single unit. The ports 112, 114, 128, 129 are located at a periphery of the housing 146 and may be at least partially contained within the housing 146. In other embodiments, the ports 112, 114, 128, 129 may be located at other locations relative to the housing 146. Although two network ports 112, 114 are shown, in other embodiments the network appliance 100 may include more than two network ports. Also, although two tool ports 128, 129 are shown, in other embodiments, the network appliance 100 may include only one tool port, or more than two tool ports.

During use, the first network port 112 of the network appliance 100 is communicatively coupled (e.g., via a network, such as the Internet) to a first node 160, and the second port 114 is communicatively coupled (e.g., via a network, such as the Internet) to a second node 162. The network appliance 100 is configured to communicate packets between the first and second nodes 160, 162 via the network ports 112, 114. Also, during use, the tool ports 128, 129 of the network appliance 100 are communicatively coupled to respective tools 170, 172. The tools 170, 172 may include, for example, one or more of an IDS, IPS, packet sniffer, monitoring system, etc. The tools 170, 172 may be directly coupled to the network appliance 100, or communicatively coupled to the network appliance 100 through the network (e.g., Internet). In some cases, the network appliance 100 is provided as a single unit that allows the network appliance 100 to be deployed at a single point along a communication path.

In the illustrated embodiments, the packet switch 140 is configured to receive packets from nodes 160, 162 via the network ports 112, 114, and process the packets in accordance with a predefined scheme. For example, the packet switch 140 may pass packets received from one or more nodes to one or more tools 170, 172 that are connected to respective tool port(s) 128, 129, respectively.

The packet switch 140 may be any switch module that provides packet transmission in accordance with a predetermined transmission scheme (e.g., a policy). In some embodiments, the packet switch 140 may be user-configurable such that packets may be transmitted in a one-to-one configuration (i.e., from one network port to an tool port). The tool may be an out-of-band device (i.e., it can only receive packets intended to be communicated between two nodes, and cannot transmit such packets downstream), such as a sniffer, a network monitoring system, an application monitoring system, an IDS, a forensic storage system, an application security system, etc.; or the tool may be an in-line device (i.e., it can receive packets, and transmit the packets back to the network appliance 100 after the packets have been processed), such as an IPS. In other embodiments, the packet switch 140 may be configured such that the packets may be transmitted in a one-to-many configuration (i.e., from one network port to multiple tool ports). In other embodiments, the packet switch 140 may be configured such that the packets may be transmitted in a many-to-many configuration (i.e., from multiple network ports to multiple tool ports). In further embodiments, the packet switch 140 may be configured such that the packets may be transmitted in a many-to-one configuration (i.e., from multiple network ports to one tool port). In some embodiments, the one-to-one, one-to-many, many-to-many, and many-to-one configurations are all available for allowing a user to selectively configure the network appliance 100 so that the packets (or certain types of packets) are routed according to any one of these configurations. In some embodiments, the packet movement configuration is predetermined such that when the network appliance 100 receives the packets, the network appliance 100 will automatically forward the packets to the ports based on the predetermined packet movement configuration (e.g., one-to-one, one-to-many, many-to-many, and many-to-one) without the need to analyze the packets (e.g., without the need to examine the header, determine the type of packets, etc.).

Examples of network appliance 100 that may be used to implement features described herein include any of the commercially available GigaVUE™ series of network visibility appliances available from Gigamon Inc. of Santa Clara, Calif.

Figure 2:
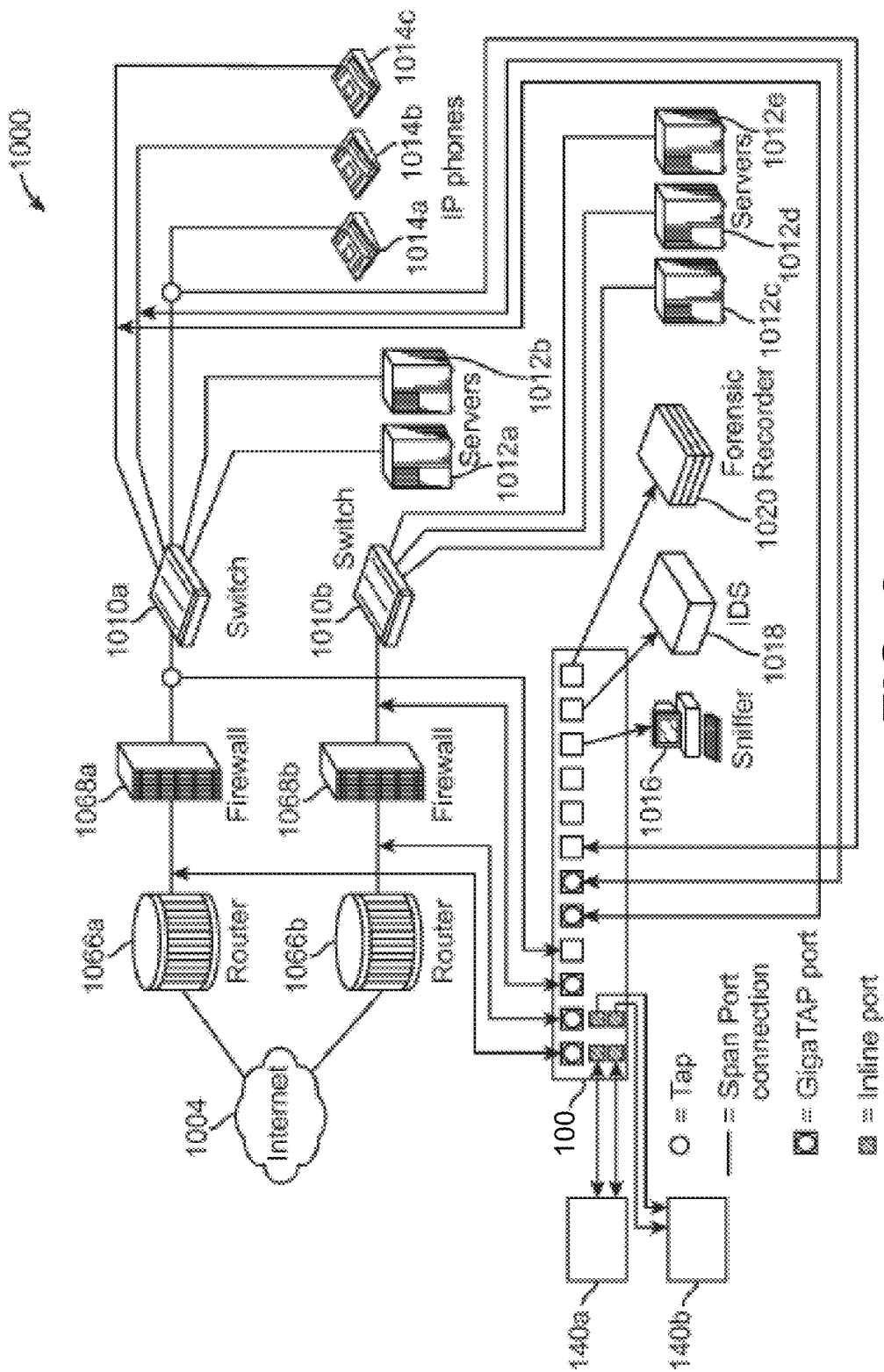
FIG. 2 illustrates an example of a deployment of a network visibility appliance on a computer network.

FIG. 2 shows an example of one possible deployment of a network appliance 200 in a network environment 1000. Network appliance 200 can be the same as or similar to network appliance 100 in FIG. 1. The Internet 1004 is coupled via routers 1006*a-b* and firewalls 1068*a-b* to two switches 1010*a* and 1010*b*. Switch 1010*a* is coupled to servers 1012*a-b* and IP phones 1014*a-c*. Switch 1010*b* is coupled to servers 1012*c-e*. A sniffer 1016, an IDS 1018 and a forensic recorder 1020 (collectively, "out-of-band tools") are coupled to the network appliance 200. The same out-of-band tools can access information anywhere in the network environment 1000 through the network appliance 200. The user has the flexibility to channel whatever traffic to whatever tool or groups of out-of-band tools, using the any-to-any, any-to-many and many-to-one capability of the system in accordance with the different embodiments described herein. For example, all the conversations of the IP phones 1014*a-c* can be easily configured to be sent to an IDS 1018. It is also possible that traffic inside a particular IP phone 1014*a-c* connection can be sent to a sniffer 1016, and IDS 1018 and a forensic recorder 1020 simultaneously via the one-to-many function.

In some embodiments, when using the network appliance 200, one or more out-of-band tools (such as IDS, sniffer, forensic recorder, etc.) may be connected to some tool port(s) of the network appliance 200, and one or more in-line tools 140*a*, 140*b* (e.g., IPS) may be connected to other tool port(s) (e.g., inline port(s)) of the network appliance 200. Such configuration allows out-of-band tool(s) and in-line tool(s) to simultaneously monitor and/or regulate network traffic.

Figure 3:
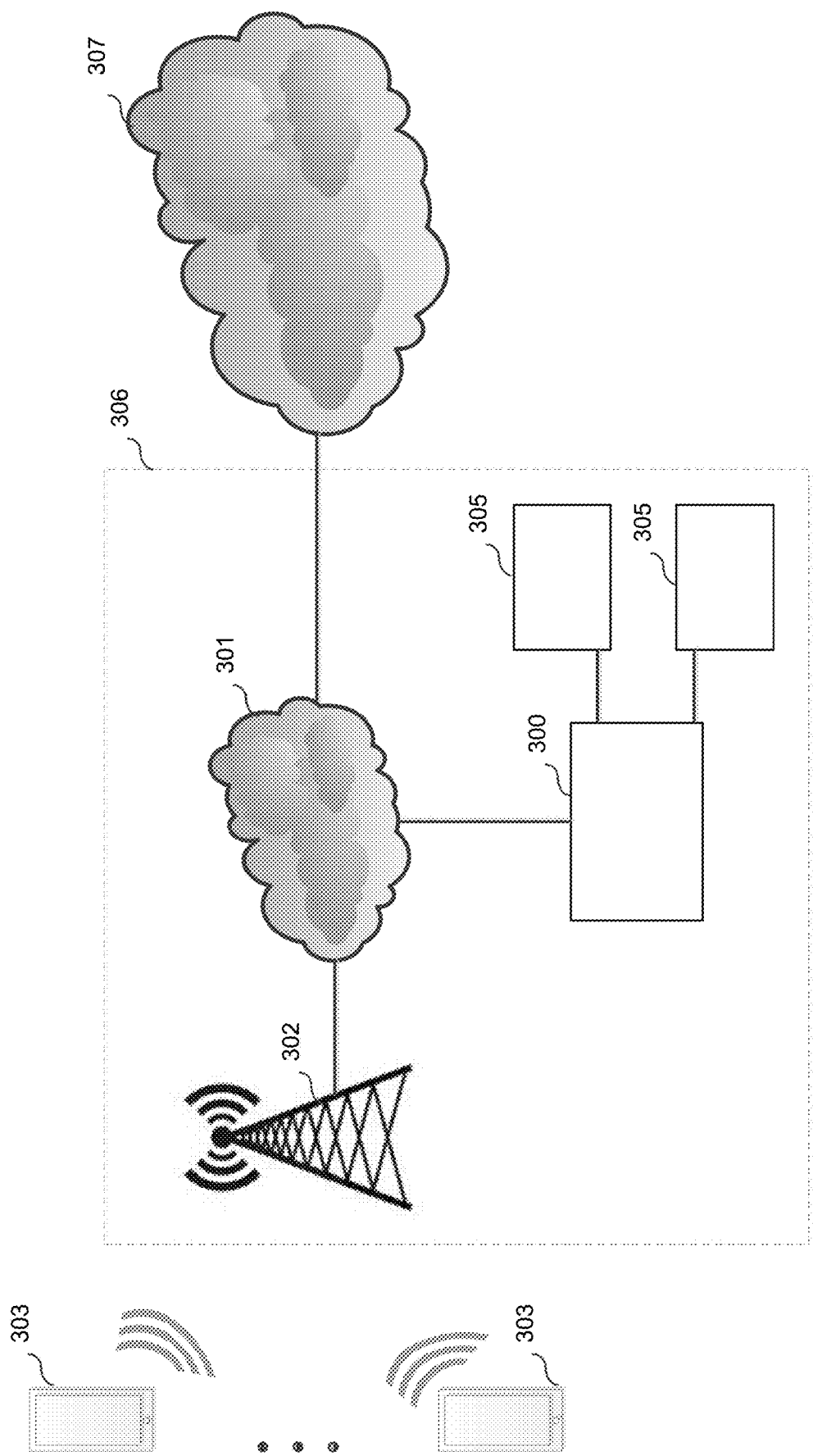
FIG. 3 shows an example of a deployment of a network visibility appliance in a wireless telecommunications network.

FIG. 3 shows an example of how a network appliance such as described above can be deployed in a core network (TRAN) of a wireless communications network. Note that FIG. 3 illustrates the deployment at a logical level, such that detailed physical connections are not necessarily depicted. A wireless operator's equipment 306 includes a core network (TRAN) 301 and a number of base stations 302, which are connected to the core network 301. Each of the base stations 302 communicates over-the-air with various user equipment (UEs) 303, i.e., mobile devices such as cell phones, belonging respectively to various subscribers. The core network 301 may also be connected to, and provide its subscribers with access to, one or more other networks 307, such as the Internet and/or a public switched telephone network (PSTN).

The wireless operator may connect one or more network appliances 300 to their core network 301, in either an in-line or out-of-band configuration. Each such network appliance 300 may be connected to one or more tools 305 and may operate in the manner described above regarding network appliance 100 or 200. Hence, the network appliance 300 may be used to facilitate monitoring, by one or more tools, of various types of network traffic traversing the core network.

Figure 4:
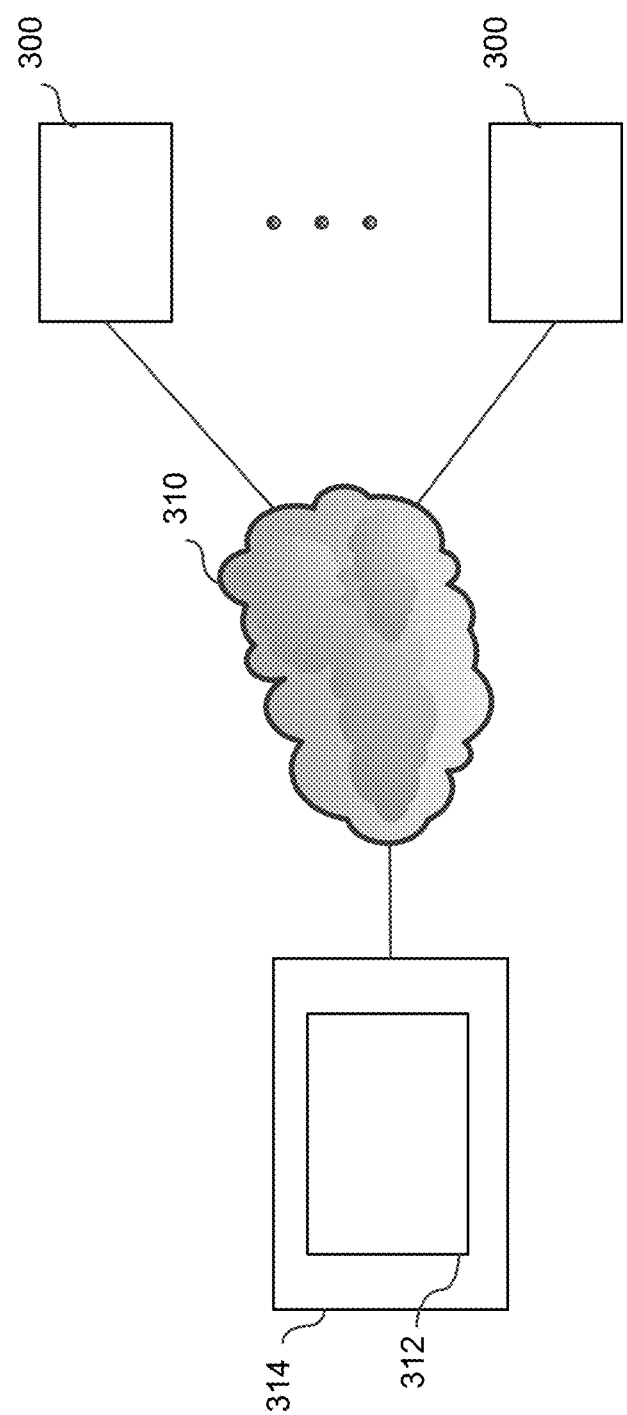
FIG. 4 shows how a network visibility appliance can be connected via a network to network visibility management software running on a separate computer system.

In at least some embodiments, a user (e.g., a core network administrator employed by the wireless operator) inputs certain parameters to the network appliance, such as the maximum throughput capacity each tool can handle and the minimum throughput capacity below which the traffic rate should not drop (for in-line operation). The user may also assign an incrementer value and/or a decrementer value, which can be in the form of a percentage, which acts as a weights to increase or decrease the traffic to a tool, respectively. These user inputs and other configuration inputs may be provided to the network appliance through network visibility management software running on a separate device from the network appliance. For example, FIG. 4 shows how one or more network appliances 300 can be connected via a network (e.g., a local area network (LAN)) 310 to network visibility management software 312 running on a separate computer system 314. To simplify illustration, the tools, network data sources and destinations are not shown in FIG. 4.

Figure 5:
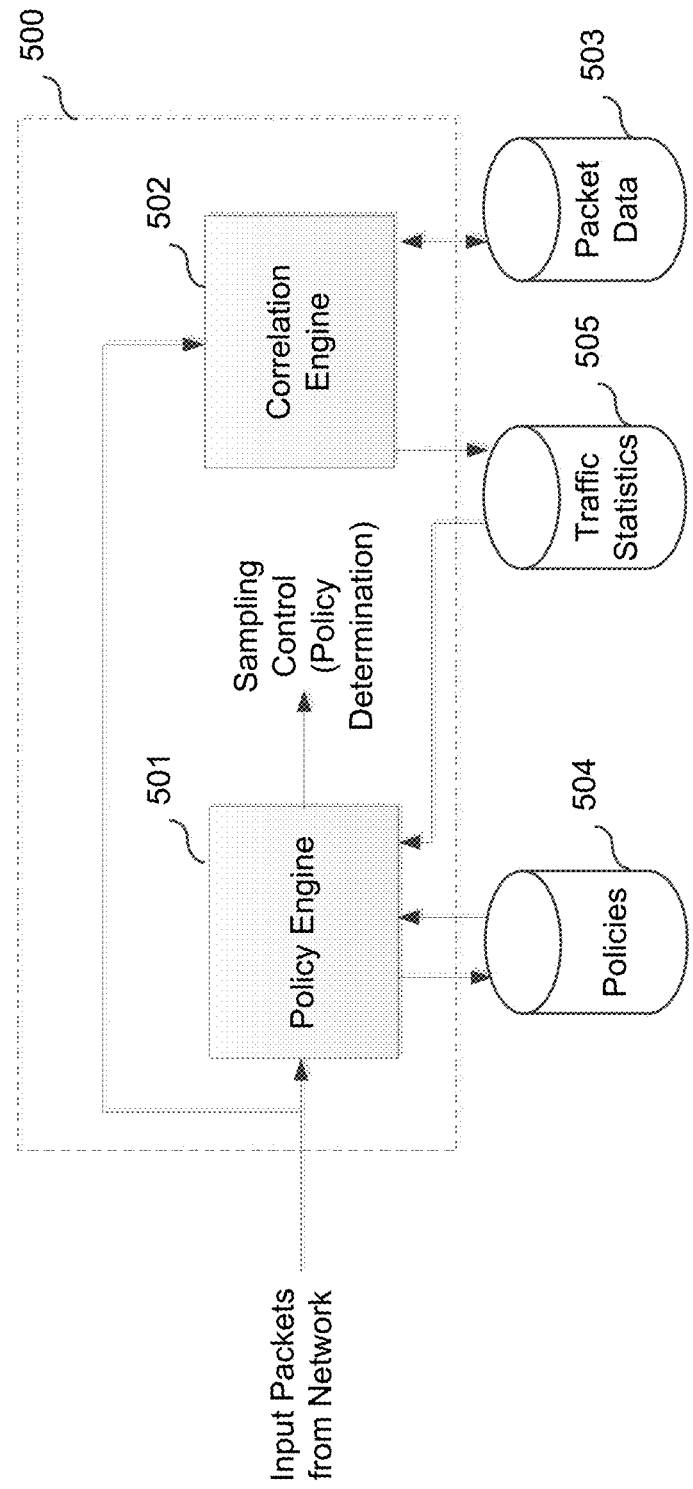
FIG. 5 shows an example of processing logic that may be included in a network visibility appliance.

FIG. 5 shows an example of processing logic that may be included in a network appliance 100, 200 or 300 to implement the dynamic policy determination technique introduced here. The processing logic 500 may be in the form of hardwired circuitry, or programmable circuitry, or a combination of programmable circuitry and software. For example, processing logic 500 can be implemented at least partially as processor 144 shown in FIG. 1. As shown, the primary elements of the processing logic 500 are a policy engine 501 and a correlation engine 502. Additionally, received packets are stored in a packets database 503. One or more flow sampling policies are stored in a policies database 504, and various network traffic statistics are stored in a traffic statistics database 505. Each of these databases 503, 504, 505 can be maintained within the network appliance 300, or within a separate device, which may be connected to the network appliance 300 via a network.

In certain embodiments, the processing logic 500 operates according to the following example. All mobility related (e.g., 3G, 4G and 5G) packets received by the network appliance 300, including control and user plane packets, enter both the policy engine 501 and the correlation engine 502. In the correlation engine 502, all packets are time-stamped, and time-correlated control packets and data packets are sent to the packet database 503 every T1 seconds. Control packets and user packets can be distinguished by their headers. In certain embodiments, each control packet is parsed by the correlation engine 502 to extract the following information elements from its headers (these parameters are taken using 4G as the example, but the parameters would be similar for 5G traffic):

Subscriber Identities: MSISDN, IMEI, IMSI and UE IP address

TEID (both source and destination TEIDs for control and data bearers)

IP addresses (both source and destination for control and data bearers)

Bearer IDs

QCI (Quality of Service Class Identifier)

User location Information: Tracking Area Code, Cell ID, Country Code and Network Code Message Types Cause codes Radio Access Technology Interface Types State of each session (completed, ongoing, failure or aged out)

Theoretical throughput parameters (GBR: Guaranteed bit rate, MBR: Maximum bit rate for dedicated bearers, and AMBR: Aggregate Maximum bit rate for default bearers for both control and data packets)

Actual throughput parameters: Total number of packets and corresponding octet count (both for control and data packets)

Service Type (stored as Access Point Name (APN))

Based on the information stored in the packets database 503, the correlation engine 502 extracts the relevant information every T1 seconds to build a subscriber throughput table that is stored in time series in the traffic statistics database 505, which also includes historical data across different time periods for different parameters. An example subscriber throughput table 601 is shown collectively in FIGS. 6A, 6B and 6C.

The correlation engine 502 queries packets from the packets database 503 every T2 seconds to calculate the following parameters, for example, to create and continually update the subscriber throughput table:

Average throughput and standard deviation from average throughput per service type per subscriber, with corresponding QCI Total average throughput and standard deviation from total average throughput per service type for all subscribers, with corresponding QCI Total average throughput and standard deviation from total average throughput per time period.

As the subscriber throughput table is built over many days, historical data is also built per service type per subscriber per time period, with corresponding QCI. Using this data, the correlation engine 502 can predict the expected traffic per service type for each subscriber for a future time period. The accuracy of prediction increases as more data is collected. For the purpose of illustration, example table 501 in FIG. 6 splits each day into just three time period and shows only two subscribers for just dedicated bearers, but the same methodology can apply even when a day is divided into more time periods and/or for more subscribers with both default and dedicated bearers.

FIG. 7 shows an example data record 701 that may be contained in the policies database 504 for a particular tool. Such a data record can be used by the policy engine 501 to determine dynamically the current sampling policy to use for each type of network traffic, for each tool. An example of a policy (expressed here in plain English only to facilitate this description) might be "Reduce IMS traffic forwarded to Tool X by 5%," or something similar. This policy would equate to forwarding 95% of all IMS flows received by the network appliance to Tool X, i.e., a sampling rate of 95%.

The policy engine 501 is responsible for dynamically determining the sampling policy to apply to network traffic (flows) of each service type, for each tool, at any given point in time. It does so based on data stored in the policies database 504 as well as information from the subscriber throughput table in statistics database 505. For example, the policy engine 501 constantly monitors network traffic characteristics in the subscriber throughput table and dynamically determines a flow sampling policy to apply for a tool, so as to decrease and/or increase traffic throughput to that tool, so that the tool is always efficiently used.

Referring now to FIG. 7, as noted above, an administrative user may be required to input the maximum throughput capacity 702 that each type 708 of tool can handle and the minimum throughput capacity 703 below which the traffic rate should not drop. The user may also be required to assign incrementer/decrementer values 704 (e.g., weights to reduce/increase the traffic). The maximum throughput seen for each service type 706 is, of course, higher than the mean throughput. Based on the QCI value 707 for each service type, the user can also assign a buffering value 705 to allow more flows to be sampled for high priority services when maximum traffic throughput is above the mean throughput. In the example of FIG. 7, the user has decided to allow a buffer of 40% for service type with QCI equal to 1, 10% for service type with QCI equal to 4, 20% for service type with QCI equal to 7, and 0% for other service types.

Every T1 seconds, when the subscriber throughput table is updated, the policy engine 501 checks the maximum capacity of the tool (for each tool) against the current throughput and against the expected throughput for the next time period, to determine if, respectively, the throughput is exceeding or is expected to exceed the tool's capacity. If the policy engine 501 determines that the tool's capacity is being exceeded or is expected to be exceeded in the next time period, it will make the decision to reduce the sampled flows for each service type 706 by the decrementer value 704 that has been assigned to that service type by the user. Flows for a given service type are reduced by reducing the numbers of flows that are sampled (i.e., forwarded to a tool) based on the decrementer value.

Figure 8:
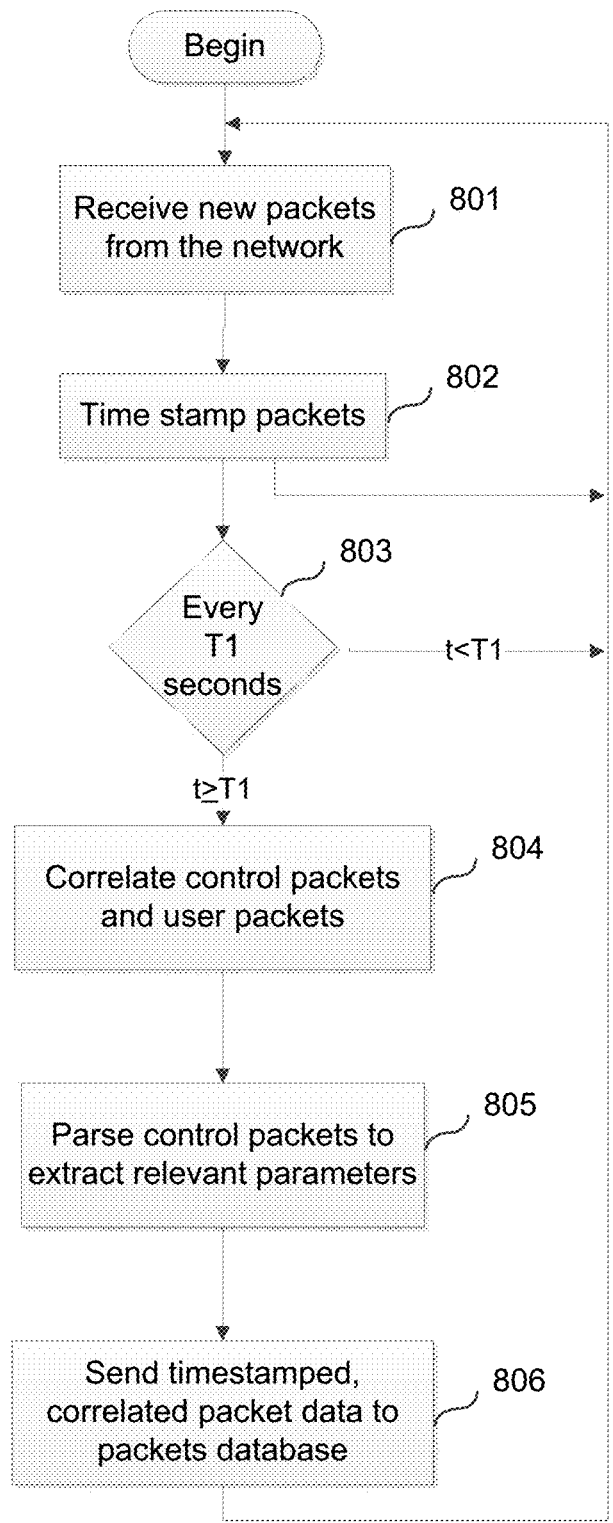
FIG. 8 is a flow diagram illustrating an example of a process that can be performed by the correlation engine in a network visibility appliance.

FIG. 8 is a flow diagram showing an example of a process that can be performed by the correlation engine 502 according to the technique introduced here. At step 801, the correlation engine 502 receives one or more new packets from the network (e.g., from the wireless operators core network). At step 802 the correlation engine 502 timestamps the received packets. Every T1 seconds (step 803), the correlation engine 502 correlates the received control packets and user packets (e.g., based on their timestamps) at step 804, parses the control packets to extract the relevant parameters (such as those mentioned above) at step 805, and sends the timestamps, correlated packet data to be packet database 503 at step 806.

Figure 9:
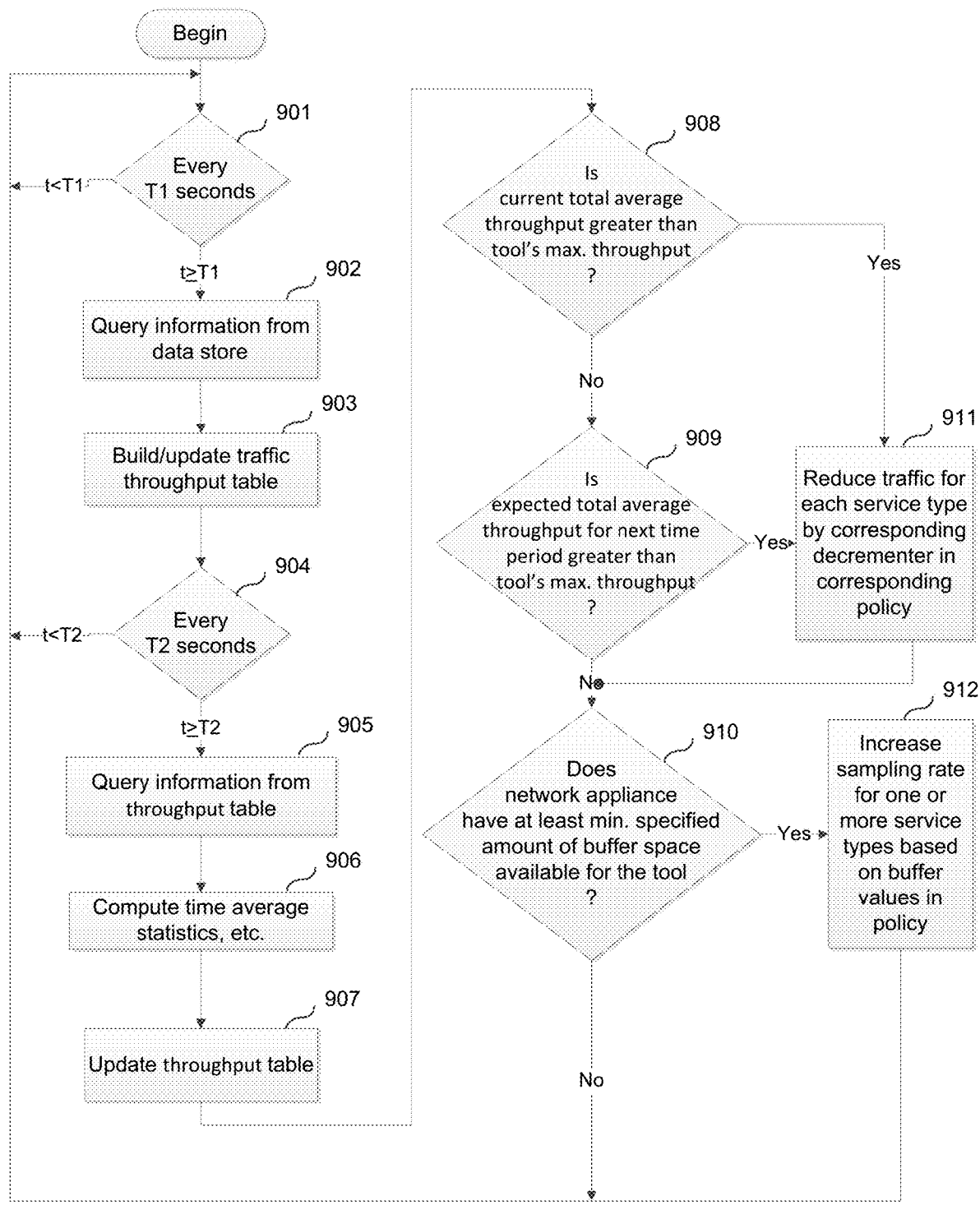
FIG. 9 is a flow diagram illustrating an example of a process that can be performed by the policy engine in a network visibility appliance.

FIG. 9 is a flow diagram showing an example of a process that can be performed by the policy engine 501 according to the technique introduced here. Every T1 seconds (step 901), the policy engine 501 queries information from the packets database 503 at step 902 and builds or updates (as the case may be) the subscriber throughput table at step 903. Every T2 seconds (step 904; T2 is greater than T1), the process flow proceeds to step 905 and subsequent steps. At step 105, the policy engine 501 queries information from the subscriber throughput table and uses that information to compute various time average statistics, such as:

Average throughput and standard deviation from average throughput per service type per subscriber, with corresponding QCI Total average throughput and standard deviation from total average throughput per service type for all subscribers, with corresponding QCI Total average throughput and standard deviation from total average throughput per time period.

The policy engine 501 then updates the subscriber throughput table with the computed values at step 907. At step 908, the policy engine 501 determines if the current total average throughput is greater than a tool's (user-specified) maximum throughput. If the answer is negative, then the policy engine 501 determines at step 909 whether the expected total average throughput for the next time period is greater than the tool's maximum throughput. If the answer to either step 908 or step 909 is affirmative, then the process proceeds to step 911, in which the policy engine 501 reduces the sampled flows for each service type by the corresponding decrementer value in the record for that tool in the policy database 504 (see the example of FIG. 7). After step 909 or step 911, the policy engine 501 determines in step 910 whether the network appliance has at least the minimum specified amount of buffer space available for the tool. If the answer is affirmative, then the policy engine 501 at step 912 increases the sampling rate for flows of one or more service types, based on the buffer values specified for each service type in the policy database 504 (e.g., buffer values 705 in FIG. 7). After step 912, or if the answer to step 910 is negative, the process loops back to step 901.

The above-described processes are now described further with reference to a specific example, using the example throughput table 601 in FIG. 6 and the example data record 701 in FIG. 7 to facilitate explanation. Each service type is assigned a decrementer value 704 in table 701, which is specified as a percentage. The maximum throughput capacity that the particular tool associated with data record 701 can handle has been specified as 50 Gbps. Assume that currently all service types are sampled at 100%, i.e., all traffic is sent to the tool.

Assume that the current time period is 00:00 to 08:00 hours on day 2. Assume further that for the current time period, the total average throughput the network is seeing is 39.5 Gbps, which is below the maximum tool capacity of (per table 701) 50 Gbps. Consequently, the policy engine 501 decides that there is no need to reduce the throughput for any service type. The policy engine 501 also looks at the next time period in table 601, which is 08:01 to 16:00 on day 2, and refers to traffic throughput on day 1. The total average throughput is 52 Gbps, which is higher than what the tool can handle. The policy engine 501, based on the historical data (from day 1), therefore decides to lower the traffic throughput for day 2 for the time period 08:01-16:00 for each service type.

To accomplish this, the policy engine 501 refers to table 701 to determine the decrementer value assigned to each service type, to reduce the traffic for the time period 08:01 to 16:00. For IMS traffic, according to table 601 the expected traffic for all subscribers is 13 Gbps. According to table 701 the decrementer for IMS traffic is 5%, so the policy engine 501 decides to reduce IMS traffic flows by 5% (i.e., sample 95%) which is 12.35 Gbps.

For video, according to table 601 the expected traffic for all subscribers is 14 Gbps. According to table 701 the decrementer for video traffic is 10%, so the policy engine 501 decides to reduce video traffic flows by 10% (i.e., sample 90%), which is 12.6 Gbps.

For Internet traffic, according to table 601 the expected traffic for all subscribers is 12 Gbps. According to table 71 the decrementer for Internet traffic is 20%, so the policy engine 501 decides to reduce the traffic flows by 20% (i.e., sample 80%), which is 9.6 Gbps.

For all other service types, according to table 601 the expected traffic for all subscribers is 13 Gbps, and according to table 701 the decrementer is 50%, so the policy engine 501 decides to reduce all other traffic flows by 50% (i.e., sample 50%), which is 6.5 Gbps.

The policy engine 501 then determines whether buffering can be utilized to increase higher priority services. The total average throughput for all service types is 41.05 Gbps, which is below the maximum tool capacity and also above the specified minimum of 40 Gbps. This information is applied by the policy engine 501 as follows. Approximately 9 Gbps of buffer is available for the tool to handle, since tool maximum capacity is 50 Gbps and currently used throughput is 41.05 Gbps. Hence, the policy engine 501 can accommodate a certain amount of extra traffic (i.e., extra flows) for one or more service types based on, for example, QCI value as defined by user in table 701, when the service types are above mean throughput. If the available tool buffer is greater than, for example, 1 Gbps, the policy engine 501 can apply the buffer values 705 in table 701 to sample extra traffic flows for one or more service types, as in the following example.

IMS traffic is specified as having the highest priority. Currently IMS traffic has its throughput reduced to 12.35 Gbps (as described above) when its mean traffic rate was at 13 Gbps. Based on table 601, it is known that the IMS service type can reach a maximum traffic throughput of 18 Gbps. When this traffic rate does increase above 13 Gbps, up to 18 Gbps, the policy engine 501 allows an additional 40% of traffic for this service type (per the buffer value 705 for IMS in table 701) above the current 12.35 Gbps, which amounts to ([12.35*(40/100)]+12.35)=17.29 Gbps. If the available tool buffer after this adjustment is at least 1 Gbps, the policy engine 501 performs a similar check for the next highest priority service type, namely, video.

For video, the current reduced traffic throughput is at 12.6 Gbps when its mean traffic rate was 14 Gbps. It is known based on table 601 that this service type can reach a maximum traffic rate of 16 Gbps. When this traffic throughput does increase above 14 Gbps, up to 16 Gbps, the policy engine 501 allows an additional 10% of traffic for this service type above the current 12.6 Gbps, which amounts to ([12.6*(10/100)]+12.6)=–13.86 Gbps. If the available tool buffer after this adjustment is at least 1 Gbps, the policy engine 501 performs a similar check for the next highest priority service type.

There is no need to allow any additional traffic for other service types even when traffic throughput increases based on the buffer value table 701.

The new increased tool throughput in this example is 17.29 Gbps (IMS)+13.86 Gbps (Video)+9.6 Gbps (Internet: existing throughput)+6.5 Gbps (other service types: existing throughput)=47.25 Gbps, which is still less than maximum tool capacity of 50 Gbps.

The policy engine 501 therefore applies these new policies for the time period 08:01-16:00. Similarly, the policy engine 501 refers to table 601 for time period 16:01 to 23:59 for day 1 and, based on the historical data, determines that throughput is going to be 72 Gbps for that time period. Consequently, the policy engine 501 determines that the traffic will need to be reduced again for day 2 and applies the same algorithm as described above in similar manner. In this way, the policy engine 501 constantly monitors network traffic characteristics in the subscriber throughput table 601 and dynamically determines the sampling policies accordingly to table 701 to decrease and/or increase traffic throughput to the tool, so that the tool is always efficiently used.

Figure 10:
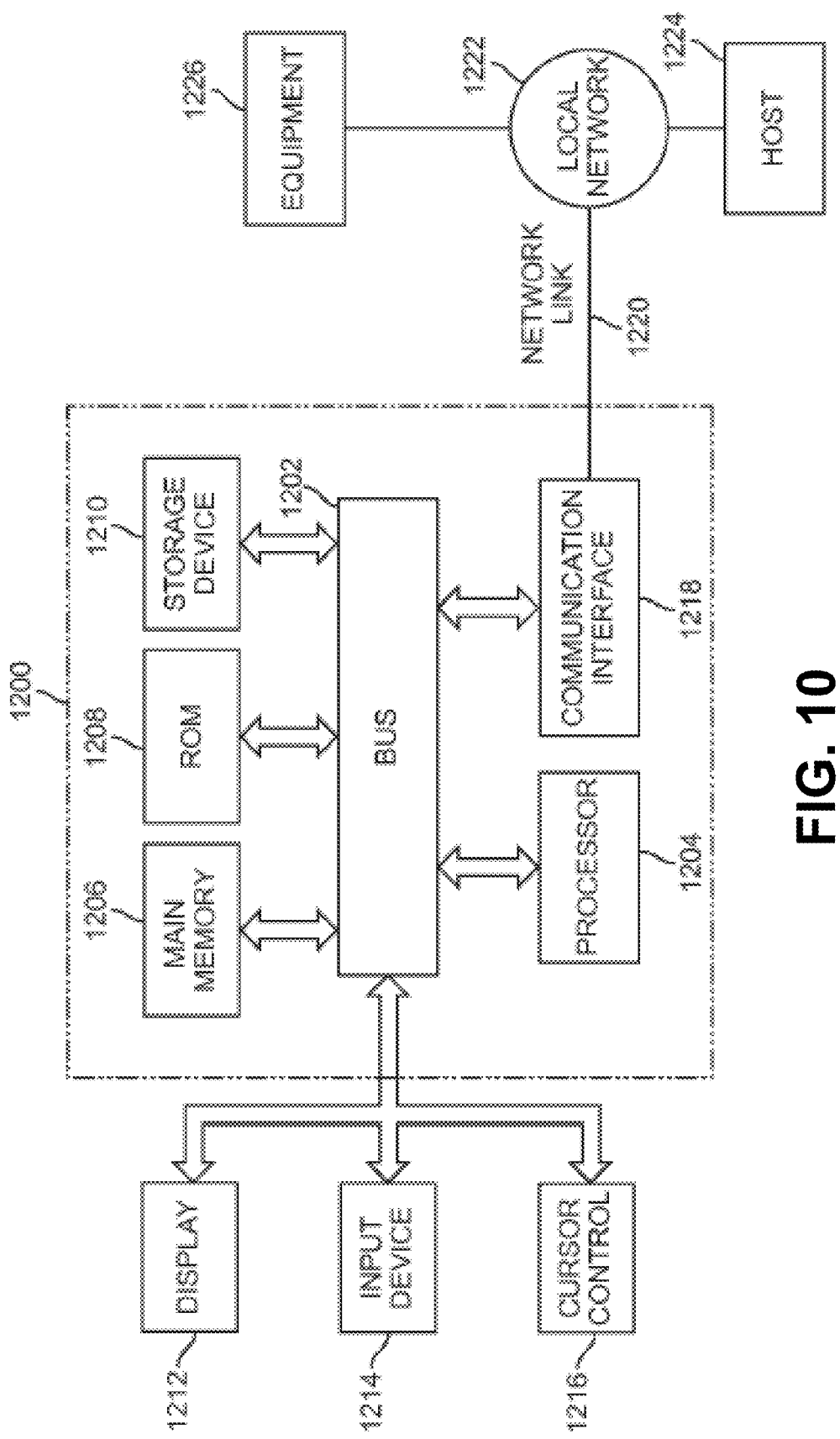
FIG. 10 is a block diagram of an example of a processing system in which techniques described herein may be implemented.

FIG. 10 is a block diagram of. an example of a processing system 1200 or other similar device in which techniques described herein may be implemented. In some embodiments, processing system 1200 represents at least a portion of the components in a network visibility appliance, such as any of network appliances 100, 200 and 300 in FIGS. 1 through 4.

As shown, system 1200 includes a bus 1202 or other communication mechanism for communicating information, and a processor 1204 coupled with the bus 1202 for processing information. The processor 1204 may be used to perform various functions described above. For example, in some embodiments, the processor 1204 may dynamically determine sampling policies and cause those policies to be applied.

The system 1200 also includes a main memory 1206, such as a random access memory (RAM) or other dynamic storage device, coupled to the bus 1202 for storing information and instructions to be executed by the processor 1204. The main memory 1206 also may be used for storing temporary variables or other intermediate information during execution of instructions to be executed by the processor 1204. The computer system 1200 further includes a read only memory (ROM) 1208 or other static storage device coupled to the bus 1202 for storing static information and instructions for the processor 1204. A data storage device 1210, such as a magnetic or optical disk, is provided and coupled to the bus 1202 for storing information and instructions.

The system 1200 may be coupled via the bus 1202 to a display 1212, such as a light emitting diode (LED) based or liquid crystal display (LCD) based monitor, for displaying information to a user. An input device 1214, including alphanumeric and other keys, is coupled to the bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212.

The system 1200 may be used for performing various functions in accordance with the techniques described herein. According to one embodiment, such use is provided by system 1200 in response to processor 1204 executing one or more sequences of one or more instructions contained in the main memory 1206. Such instructions may be read into the main memory 1206 from another computer-readable medium, such as storage device 1210. Execution of the sequences of instructions contained in the main memory 1206 causes the processor 1204 to perform the process steps described herein. One or more processors in a multi-processing arrangement may also be employed to execute the sequences of instructions contained in the main memory 1206. In alternative embodiments, hard-wired circuitry may be used in place of or in combination with software instructions to implement features of the embodiments described herein. Thus, embodiments described herein are not limited to any specific combination of hardware circuitry and software.

Unless contrary to physical possibility, it is envisioned that (i) the methods/steps described herein may be performed in any sequence and/or in any combination, and that (ii) the components of respective embodiments may be combined in any manner.

The machine-implemented operations described above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, tablet computer, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, means: a) special-purpose hardwired circuitry, such as one or more application-specific integrated circuits (ASICs), programmable logic devices (PLDs), field programmable gate arrays (FPGAs), or other similar device(s); b) programmable circuitry programmed with software and/or firmware, such as one or more programmed general-purpose microprocessors, digital signal processors (DSPs) and/or microcontrollers, system-on-a-chip systems (SOCs), or other similar device(s); or c) a combination of the forms mentioned in a) and b).

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

EXAMPLES OF CERTAIN EMBODIMENTS

Certain embodiments of the technology introduced herein are summarized in the following numbered examples:

1. A method comprising:
receiving, by a network appliance, a first plurality of flows communicated on a network, each said flow including a series of packets between a source and a destination within a same transport connection, the network appliance being configured to forward packets selectively to a tool that is external to the network appliance;
ascertaining a characteristic of data traffic associated with the network, by examining packets of the first plurality of flows;
dynamically determining, by the network appliance, a sampling policy for use in determining a forwarding of flows from the network appliance to the tool, based on the ascertained characteristic of the data traffic, without user input specifying the sampling policy;
receiving, by the network appliance, a second plurality of flows communicated on the network; and
using the determined sampling policy, by the network appliance, to select flows of the second plurality of flows to be forwarded to the tool.

2. The method of example 1, wherein dynamically determining the sampling policy comprises dynamically deriving a modified sampling policy based on a sampling policy currently in use by the network appliance.

3. The method of example 1 or example 2, wherein the second plurality of flows include flows of a first type of network traffic and flows of a second type of network traffic, and wherein said using the determined sampling policy comprises:
selecting a first sampling rate for sampling the first type of network traffic and a second sampling rate for sampling the second type of network traffic, the second sampling rate not being equal to the first sampling rate, the first and second sampling rates being indicative, respectively, of a subset of traffic of the first type to be forwarded to the tool and a subset of traffic of the second type to be forwarded to the tool.

4. The method of any of examples 1 through 3, wherein dynamically determining the sampling policy comprises:
determining an expected value of the characteristic of the data traffic for a future time period; and
determining the sampling policy based on the expected value of the characteristic of the data traffic and a performance parameter of the tool.

5. The method of any of examples 1 through 4, wherein ascertaining the characteristic of the data traffic comprises determining a first value of a first performance parameter associated with the network during a first time period.

6. The method of any of examples 1 through 5, wherein the first performance parameter is a throughput associated with the network.

7. The method of any of examples 1 through 6, further comprising, prior to said using the determined sampling policy:
determining a second value of the first performance parameter associated with the network during a second time period that is after the first time period; and
selecting said determined sampling policy for use, based on the second value of the first performance parameter.

8. The method of any of examples 1 through 7, wherein using the determined sampling policy further comprises:
when a second value of the first performance parameter exceeds a specified maximum value of a second performance parameter associated with the tool, reducing, by the network appliance, a sampling rate of a traffic type in the second plurality of flows, the sampling rate being indicative of a subset of the second plurality of flows that are to be forwarded to the tool.

9. The method of any of examples 1 through 8, wherein using the determined sampling policy further comprises:
when a second value of the first performance parameter exceeds a specified maximum value of a second performance parameter associated with the tool, routing, by the network appliance, flows of a traffic type of the second plurality of flows, to a second tool.

10. The method of any of examples 1 through 9, wherein using the determined sampling policy further comprises:
when a second value of the first performance parameter is less than a specified maximum value of a second performance parameter associated with the tool, increasing, by the network appliance, a sampling rate of a traffic type of a plurality of traffic types, according to a specified value, the sampling rate being indicative of a subset of the second plurality of flows that are to be forwarded to the tool.

11. The method of any of examples 1 through 10, wherein increasing the sampling rate comprises buffering at least some flows of the traffic type in the network appliance.

12. The method of any of examples 1 through 11, further comprising:
receiving user input indicative of a decrement value;
wherein the sampling policy comprises the decrement value, and wherein using the determined sampling policy comprises reducing a sampling rate for the second plurality of flows based on the decrement value.

13. The method of any of examples 1 through 12, wherein the network comprises a terrestrial radio access network (TRAN) portion of a wireless telecommunication network.

14. The method of any of examples 1 through 13, wherein ascertaining the characteristic of the data traffic comprises analyzing control headers of packets of flows tapped by the network appliance from control interfaces and/or user interfaces in the TRAN portion of the wireless telecommunication network.

15. The method of any of examples 1 through 15, wherein using the determined sampling policy further comprises reducing, by the network appliance, a sampling rate of a particular traffic type in the second plurality of flows to zero, to prevent forwarding of any flows of the particular traffic type to the tool.

16. A network appliance comprising:
a first network port through which to receive a first plurality of flows originated by a plurality of sources on a network, each said flow including a series of packets between a source and a destination within a same transport connection;
a first instrument port through which to forward at least some of the first plurality of flows to a tool;
a second instrument port through which to receive the at least some of the first plurality of flows from the tool after the tool has processed the flows;
a second network port through which to forward the first plurality of flows onto the network for delivery to a destination; and
a processor configured to cause the network appliance to perform operations including
ascertaining a characteristic of data traffic associated with the network, by examining the first plurality of flows;
dynamically determining a sampling policy for forwarding flows from the network appliance to the tool, based on the ascertained characteristic of the data traffic, without user input specifying the sampling policy;
receiving, by the network appliance, a second plurality of flows communicated on the network; and
using the determined sampling policy to select some but not all of the second plurality of flows to be forwarded by the network appliance to the tool.

17. The network appliance of example 16, wherein dynamically determining the sampling policy comprises dynamically deriving a modified sampling policy based on a sampling policy currently in use by the network appliance.

18. The network appliance of example 16 or example 17, wherein the second plurality of flows include flows of a first type of network traffic and flows of a second type of network traffic, and wherein said using the determined sampling policy comprises:
selecting a first sampling rate for sampling the first type of network traffic and a second sampling rate for sampling the second type of network traffic, the second sampling rate not being equal to the first sampling rate, the first and second sampling rates being indicative, respectively, of a subset of traffic of the first type to be forwarded to the tool and a subset of traffic of the second type to be forwarded to the tool.

19. The network appliance of any of examples 16 through 18, wherein ascertaining the characteristic of the data traffic comprises determining a first value of a first performance parameter associated with the network during a first time period.

20. The network appliance of any of examples 16 through 19, wherein the first performance parameter is a throughput associated with the network.

21. The network appliance of any of examples 16 through 20, further comprising, prior to said using the determined sampling policy:
determining a second value of the first performance parameter associated with the network during a second time period that is after the first time period; and
selecting said determined sampling policy for use, based on the second value of the first performance parameter.

22. The network appliance of any of examples 16 through 21, wherein using the determined sampling policy further comprises:

when a second value of the first performance parameter exceeds a specified maximum value of a second performance parameter associated with the tool, reducing, by the network appliance, a sampling rate of a traffic type the second plurality of flows, the sampling rate being indicative of a subset of the second plurality of flows that are to be forwarded to the tool.

23. The network appliance of any of examples 16 through 22, wherein using the determined sampling policy further comprises:
when a second value of the first performance parameter exceeds a specified maximum value of a second performance parameter associated with the tool, routing, by the network appliance, flows of a traffic type of the second plurality of flows, to a second tool.

24. The network appliance of any of examples 16 through 23, wherein using the determined sampling policy further comprises:
when a second value of the first performance parameter is less than a specified maximum value of a second performance parameter associated with the tool, increasing, by the network appliance, a sampling rate of a traffic type of a plurality of traffic types, according to a specified value, the sampling rate being indicative of a subset of the second plurality of flows that are to be forwarded to the tool.

25. The network appliance of any of examples 16 through 24, wherein increasing the sampling rate comprises buffering at least some flows of the traffic type in the network appliance.

26. The network appliance of any of examples 16 through 25, further comprising:
receiving user input indicative of a decrement value;
wherein the sampling policy comprises the decrement value, and wherein using the determined sampling policy comprises reducing a sampling rate for the second plurality of flows based on the decrement value.

27. The network appliance of any of examples 16 through 26, wherein the network comprises a terrestrial radio access network (TRAN) portion of a wireless telecommunication network.

28. The network appliance of any of examples 16 through 27, wherein using the determined sampling policy further comprises reducing, by the network appliance, a sampling rate of a particular traffic type in the second plurality of flows to zero, to prevent forwarding of any flows of the particular traffic type to the tool.

29. A non-transitory machine-readable storage medium tangibly storing code, execution of which by at least one processor in a network appliance causes the network appliance to perform operations comprising:
receiving a first plurality of flows communicated on a network, each said flow including a series of packets between a source and a destination within a same transport connection, the network appliance being configured to forward flows selectively to a tool that is external to the network appliance;
ascertaining a characteristic of data traffic associated with the network, by examining the first plurality of flows;
dynamically determining a sampling policy for forwarding flows from the network appliance to the tool, based on the ascertained characteristic of the data traffic, without user input specifying the sampling policy;
receiving, by the network appliance, a second plurality of flows communicated on the network;
accessing the determined sampling policy, by the network appliance; and using the determined sampling policy, by the network appliance, to select flows of the second plurality of flows to be forward to the tool.

30. The non-transitory machine-readable storage medium of example 29, wherein ascertaining the characteristic of the data traffic comprises determining a first value of a first performance parameter associated with the network during a first time period;

the method further comprising, prior to said using the determined sampling policy:

determining a second value of the first performance parameter associated with the network during a second time period that is after the first time period; and selecting the sampling policy for use, based on the second value of the first performance parameter;

and wherein using the sampling policy comprises at least one of the following operations:

when a second value of the first performance parameter exceeds a specified maximum value of a second performance parameter associated with the tool, reducing a sampling rate of a traffic type the second plurality of flows, the sampling rate being indicative of a subset of the second plurality of flows that are to be forwarded to the tool;

when the second value of the first performance parameter exceeds the specified maximum value of a second performance parameter associated with the tool, routing flows of a traffic type of the second plurality of flows, to a second tool; or when the second value of the first performance parameter is less than a specified maximum value of a second performance parameter associated with the tool, increasing a sampling rate of a traffic type of a plurality of traffic types, according to a specified value.

31. The non-transitory machine-readable storage medium of example 29 or example 30, wherein the second plurality of flows include flows of a first type of network traffic and flows of a second type of network traffic, and wherein said using the determined sampling policy comprises:

selecting a first sampling rate for sampling the first type of network traffic and a second sampling rate for sampling the second type of network traffic, the second sampling rate not being equal to the first sampling rate, the first and second sampling rates being indicative, respectively, of a subset of traffic of the first type to be forwarded to the tool and a subset of traffic of the second type to be forwarded to the tool.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:

receiving, by a network appliance, a first plurality of flows communicated on a network during a first time period, each said flow including a series of packets between a source and a destination within a same transport connection, the network appliance being configured to forward packets selectively to a tool that is external to the network appliance;

ascertaining an expected value of a characteristic of data traffic associated with the network for a second time period that is after the first time period, by examining packets of the first plurality of flows;

dynamically determining, by the network appliance, a sampling policy for use in determining a forwarding of flows from the network appliance to the tool, based on the ascertained expected value of the characteristic of the data traffic, without user input specifying the sampling policy;

receiving, by the network appliance, a second plurality of flows communicated on the network during the second time period; and using the determined sampling policy, by the network appliance, to select flows of the second plurality of flows to be forwarded to the tool.

2. The method of claim 1, wherein dynamically determining the sampling policy comprises dynamically deriving a modified sampling policy based on a sampling policy currently in use by the network appliance.

3. The method of claim 1, wherein the second plurality of flows include flows of a first type of network traffic and flows of a second type of network traffic, and wherein said using the determined sampling policy comprises:

selecting a first sampling rate for sampling the first type of network traffic and a second sampling rate for sampling the second type of network traffic, the second sampling rate not being equal to the first sampling rate, the first and second sampling rates being indicative, respectively, of a subset of traffic of the first type to be forwarded to the tool and a subset of traffic of the second type to be forwarded to the tool.

4. The method of claim 1, wherein dynamically determining the sampling policy further comprises:

determining the sampling policy based on a performance parameter of the tool.

5. The method of claim 1, wherein ascertaining the characteristic of the data traffic comprises determining a first value of a first performance parameter associated with the network during the first time period.

6. The method of claim 5, wherein the first performance parameter is a throughput associated with the network.

7. The method of claim 5, further comprising, prior to said using the determined sampling policy:

determining a second value of the first performance parameter associated with the network during the second time period; and selecting said determined sampling policy for use, based on the second value of the first performance parameter.

8. The method of claim 5, wherein using the determined sampling policy further comprises:

when a second value of the first performance parameter exceeds a specified maximum value of a second performance parameter associated with the tool, reducing, by the network appliance, a sampling rate of a traffic type in the second plurality of flows, the sampling rate being indicative of a subset of the second plurality of flows that are to be forwarded to the tool.

9. The method of claim 5, wherein using the determined sampling policy further comprises:

when a second value of the first performance parameter exceeds a specified maximum value of a second performance parameter associated with the tool, routing, by the network appliance, flows of a traffic type of the second plurality of flows, to a second tool.

10. The method of claim 5, wherein using the determined sampling policy further comprises:

when a second value of the first performance parameter is less than a specified maximum value of a second performance parameter associated with the tool, increasing, by the network appliance, a sampling rate of a traffic type of a plurality of traffic types, according to a specified value, the sampling rate being indicative of a subset of the second plurality of flows that are to be forwarded to the tool.

11. The method of claim 10, wherein increasing the sampling rate comprises buffering at least some flows of the traffic type in the network appliance.

12. The method of claim 1, further comprising:
receiving user input indicative of a decrement value;
wherein the sampling policy comprises the decrement value, and wherein using the determined sampling policy comprises reducing a sampling rate for the second plurality of flows based on the decrement value.

13. The method of claim 1, wherein the network comprises a terrestrial radio access network (TRAN) portion of a wireless telecommunication network.

14. The method of claim 13, wherein ascertaining the characteristic of the data traffic comprises analyzing control headers of packets of flows tapped by the network appliance from control interfaces and/or user interfaces in the TRAN portion of the wireless telecommunication network.

15. The method of claim 1, wherein using the determined sampling policy further comprises reducing, by the network appliance, a sampling rate of a particular traffic type in the second plurality of flows to zero, to prevent forwarding of any flows of the particular traffic type to the tool.

16. A network appliance comprising:
a first network port through which to receive a first plurality of flows originated by a plurality of sources on a network during a first time period, each said flow including a series of packets between a source and a destination within a same transport connection;
a first instrument port through which to forward at least some of the first plurality of flows to a tool;
a second instrument port through which to receive the at least some of the first plurality of flows from the tool after the tool has processed the flows;
a second network port through which to forward the first plurality of flows onto the network for delivery to a destination; and
a processor configured to cause the network appliance to perform operations including
ascertaining an expected value of a characteristic of data traffic associated with the network for a second time period that is after the first time period, by examining packets of the first plurality of flows;
dynamically determining a sampling policy for forwarding flows from the network appliance to the tool, based on the ascertained expected value of the characteristic of the data traffic, without user input specifying the sampling policy;
receiving, by the network appliance, a second plurality of flows communicated on the network during the second time period; and
using the determined sampling policy to select some but not all of the second plurality of flows to be forwarded by the network appliance to the tool.

17. The network appliance of claim 16, wherein dynamically determining the sampling policy comprises dynamically deriving a modified sampling policy based on a sampling policy currently in use by the network appliance.

18. The network appliance of claim 16, wherein the second plurality of flows include flows of a first type of network traffic and flows of a second type of network traffic, and wherein said using the determined sampling policy comprises:
selecting a first sampling rate for sampling the first type of network traffic and a second sampling rate for sampling the second type of network traffic, the second sampling rate not being equal to the first sampling rate, the first and second sampling rates being indicative, respectively, of a subset of traffic of the first type to be forwarded to the tool and a subset of traffic of the second type to be forwarded to the tool.

19. The network appliance of claim 16, wherein ascertaining the characteristic of the data traffic comprises determining a first value of a first performance parameter associated with the network during the first time period.

20. The network appliance of claim 19, wherein the first performance parameter is a throughput associated with the network.

21. The network appliance of claim 19, further comprising, prior to said using the determined sampling policy:
determining a second value of the first performance parameter associated with the network during the second time period; and
selecting said determined sampling policy for use, based on the second value of the first performance parameter.

22. The network appliance of claim 19, wherein using the determined sampling policy further comprises:
when a second value of the first performance parameter exceeds a specified maximum value of a second performance parameter associated with the tool, reducing, by the network appliance, a sampling rate of a traffic type the second plurality of flows, the sampling rate being indicative of a subset of the second plurality of flows that are to be forwarded to the tool.

23. The network appliance of claim 19, wherein using the determined sampling policy further comprises:
when a second value of the first performance parameter exceeds a specified maximum value of a second performance parameter associated with the tool, routing, by the network appliance, flows of a traffic type of the second plurality of flows, to a second tool.

24. The network appliance of claim 19, wherein using the determined sampling policy further comprises:
when a second value of the first performance parameter is less than a specified maximum value of a second performance parameter associated with the tool, increasing, by the network appliance, a sampling rate of a traffic type of a plurality of traffic types, according to a specified value, the sampling rate being indicative of a subset of the second plurality of flows that are to be forwarded to the tool.

25. The network appliance of claim 24, wherein increasing the sampling rate comprises buffering at least some flows of the traffic type in the network appliance.

26. The network appliance of claim 16, further comprising:
receiving user input indicative of a decrement value;
wherein the sampling policy comprises the decrement value, and wherein using the determined sampling policy comprises reducing a sampling rate for the second plurality of flows based on the decrement value.

27. The network appliance of claim 16, wherein the network comprises a terrestrial radio access network (TRAN) portion of a wireless telecommunication network.

28. The network appliance of claim 16, wherein using the determined sampling policy further comprises reducing, by the network appliance, a sampling rate of a particular traffic type in the second plurality of flows to zero, to prevent forwarding of any flows of the particular traffic type to the tool.

29. A non-transitory machine-readable storage medium tangibly storing code, execution of which by at least one processor in a network appliance causes the network appliance to perform operations comprising:
   receiving a first plurality of flows communicated on a network during a first time period, each said flow including a series of packets between a source and a destination within a same transport connection, the network appliance being configured to forward flows selectively to a tool that is external to the network appliance;
   ascertaining an expected value of a characteristic of data traffic associated with the network for a second time period that is after the first time period, by examining packets of the first plurality of flows;
   dynamically determining a sampling policy for forwarding flows from the network appliance to the tool, based on the ascertained expected value of the characteristic of the data traffic, without user input specifying the sampling policy;
   receiving, by the network appliance, a second plurality of flows communicated on the network during the second time period;
   accessing the determined sampling policy, by the network appliance; and
   using the determined sampling policy, by the network appliance, to select flows of the second plurality of flows to be forward to the tool.

30. The non-transitory machine-readable storage medium of claim 29, wherein ascertaining the characteristic of the data traffic comprises determining a first value of a first performance parameter associated with the network during the first time period;
   the method further comprising, prior to said using the determined sampling policy:
      determining a second value of the first performance parameter associated with the network during the second time period; and
      selecting the sampling policy for use, based on the second value of the first performance parameter; and
   wherein using the sampling policy comprises at least one of the following operations:
      when a second value of the first performance parameter exceeds a specified maximum value of a second performance parameter associated with the tool, reducing a sampling rate of a traffic type the second plurality of flows, the sampling rate being indicative of a subset of the second plurality of flows that are to be forwarded to the tool;
      when the second value of the first performance parameter exceeds the specified maximum value of a second performance parameter associated with the tool, routing flows of a traffic type of the second plurality of flows, to a second tool; or
      when the second value of the first performance parameter is less than a specified maximum value of a second performance parameter associated with the tool, increasing a sampling rate of a traffic type of a plurality of traffic types, according to a specified value.

31. The non-transitory machine-readable storage medium of claim 29, wherein the second plurality of flows include flows of a first type of network traffic and flows of a second type of network traffic, and wherein said using the determined sampling policy comprises:
   selecting a first sampling rate for sampling the first type of network traffic and a second sampling rate for sampling the second type of network traffic, the second sampling rate not being equal to the first sampling rate, the first and second sampling rates being indicative, respectively, of a subset of traffic of the first type to be forwarded to the tool and a subset of traffic of the second type to be forwarded to the tool.

* * * * *